United States Patent
Cowans

(10) Patent No.: US 6,775,996 B2
(45) Date of Patent: Aug. 17, 2004

(54) SYSTEMS AND METHODS FOR TEMPERATURE CONTROL

(75) Inventor: Kenneth W. Cowans, Fullerton, CA (US)

(73) Assignee: Advanced Thermal Sciences Corp., Anaheim, CA (US)

( * ) Notice: Subject to any disclaimer, the term of this patent is extended or adjusted under 35 U.S.C. 154(b) by 119 days.

(21) Appl. No.: 10/079,542

(22) Filed: Feb. 22, 2002

(65) Prior Publication Data

US 2003/0159456 A1 Aug. 28, 2003

(51) Int. Cl.[7] ............................. F25D 17/02; F25B 49/02
(52) U.S. Cl. ........................ 62/160; 62/196.4; 62/201; 62/259.2
(58) Field of Search ....................... 62/159, 160, 196.4, 62/238.1, 238.6, 238.7, 196.1, 196.3, 201, 185, 98, 259.1, 259.2

(56) References Cited

U.S. PATENT DOCUMENTS

| | | | |
|---|---|---|---|
| 2,357,706 A | | 9/1944 | Toepperwein |
| 3,069,867 A | * | 12/1962 | Ringquist .................... 62/159 |
| 3,735,805 A | | 5/1973 | Stillhard |
| 3,847,209 A | | 11/1974 | Mascall |
| 4,802,338 A | * | 2/1989 | Oswalt et al. ............. 62/196.4 |
| 5,076,068 A | * | 12/1991 | Mikhail ....................... 62/201 |
| 5,097,890 A | | 3/1992 | Nakao |
| 5,183,101 A | * | 2/1993 | Penaluna et al. .......... 62/196.4 |
| 5,201,187 A | | 4/1993 | Yoshikawa et al. |
| 5,333,460 A | | 8/1994 | Lewis et al. |
| 5,333,676 A | | 8/1994 | Mizuno |
| 5,348,076 A | | 9/1994 | Asakawa |
| 5,365,749 A | | 11/1994 | Porter |
| 5,413,164 A | | 5/1995 | Teshima et al. |
| 5,802,856 A | | 9/1998 | Schaper et al. |
| 5,941,086 A | | 8/1999 | Petrulio et al. |
| 6,102,113 A | | 8/2000 | Cowans |
| 6,311,506 B1 | * | 11/2001 | Takahashi et al. ......... 62/196.4 |

OTHER PUBLICATIONS

US 5,706,890, 1/1998, Sloan et al. (withdrawn)

* cited by examiner

Primary Examiner—Harry B. Tanner
(74) Attorney, Agent, or Firm—Jones, Tullar & Cooper PC

(57) ABSTRACT

The problem of controlling the temperature of the different units in a process tool system which have to be cooled or heated using thermal transfer fluid at selected setpoints and flow rates is resolved by a system having multiple modular units each with some operative and form factor commonality but at least dual functional capability. The modular units each have separate recirculation loops for thermal transfer fluid but cool the fluid using refrigeration cycles or facilities water supplies or heat the fluid using compressed hot gases or electrical energy. By employing operative units which can be internally varied to provide different thermal capacities within form factor constraints, the system enables concurrent temperature control needs of a number of different units to be met with an energy efficient, low footprint, highly adaptable system.

17 Claims, 11 Drawing Sheets

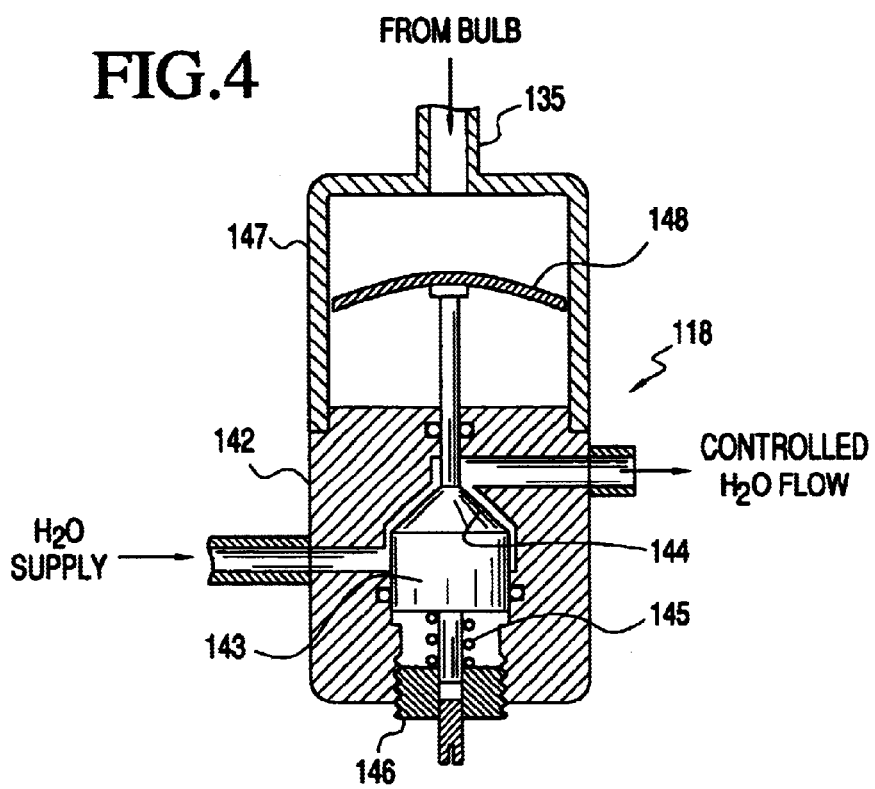
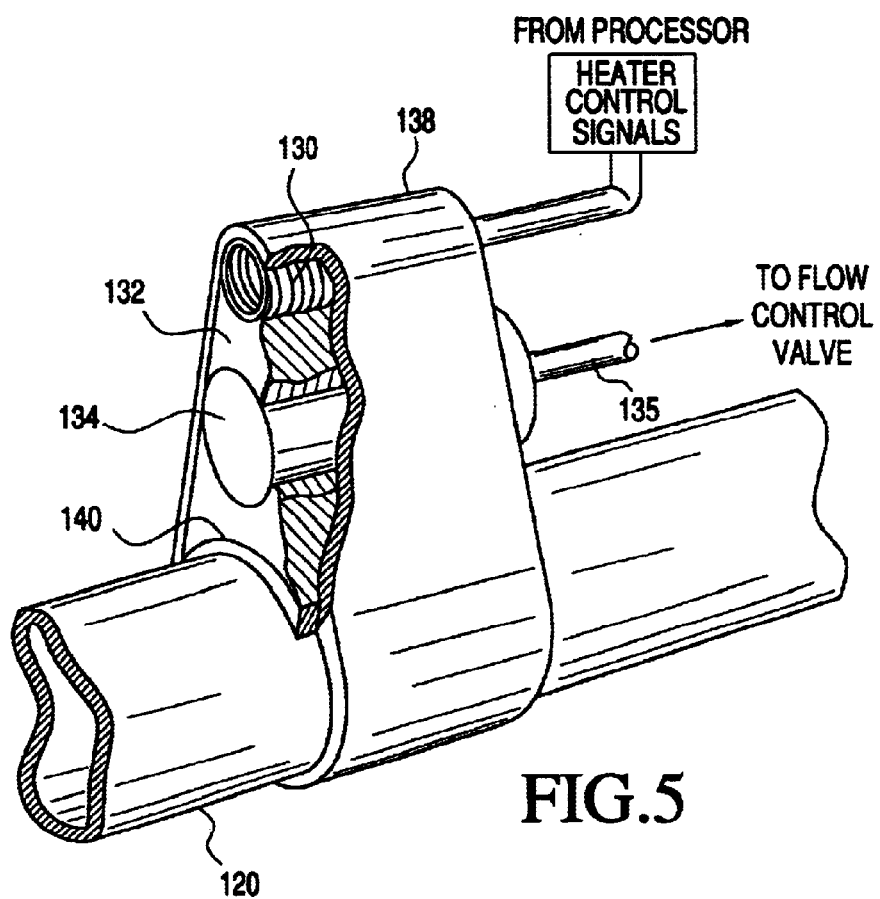

SYSTEMS AND METHODS FOR TEMPERATURE CONTROL

FIELD OF THE INVENTION

This invention pertains to controlling the temperature of process tools using thermal transfer fluids, and more particularly to meeting the needs of industries which require precise but selectable control of the temperature of units having different thermal loads, such as fabrication equipment using cluster tools for making high precision semiconductors.

BACKGROUND OF THE INVENTION

Temperature control units for industries which manufacture high precision products, such as multiple semiconductor chips on wafers, must meet a number of stringent and sometimes conflicting requirements. While the manufacture of semiconductors perhaps imposes greater demands than are encountered in most other industrial fields, this industry illustrates particularly well the extent and variety of the problems which might now be encountered with modern temperature control systems. Semiconductor fabrication installations usually include many so-called cluster tools disposed throughout a high cost facility. Wafers are processed using successive steps which demand both high energy usage and close temperature control during removal or addition of thermal energy. Examples of these steps include chemical and high energy deposition and etching procedures carried out in specialized chambers. To maintain the appropriate internal environment and the particular temperature conditions needed for a given process step, separate temperature control units are usually employed to provide a chilled or heated thermal transfer fluid for circulation through the operative process parts of a tool. The temperature control unit must not only maintain the thermal transfer fluid at a prescribed setting and also bring the fluid temperature to its setpoint within specified time limits, but also operate over long periods with very limited down time, be energy efficient and demand minimal floor space.

Preferred systems for such applications have included temperature control units as described in Kenneth W. Cowans U.S. Pat. No. 6,102,113 entitled "Temperature Control of Individual Tools in a Cluster Tool System". These temperature control units provide multichannel capability for the control of several different process temperatures by delivery of pressurized refrigerant to chill thermal transfer fluid flows, or by regulated heating of thermal transfer fluids. For refrigerating the thermal transfer fluid, pressurized liquid refrigerant in each channel is passed through an expansion valve regulating flow to an evaporator/heat exchanger. For heating the thermal transfer fluid each channel includes a separate heat source. This temperature control unit employs a single refrigeration unit and single reservoir for the thermal transfer fluid, and uses a different pump in each channel for fluid recirculation. The system has proven to be extremely reliable, requires low floor space (footprint) and provides precise temperature control of the thermal transfer fluid, in both static and dynamic modes.

With time, however, and with the evolution of new cluster tool systems and other units for semiconductor fabrication, a number of additional and particular requirements have more recently been imposed. Thus further and different needs must now be met that necessitate greater flexibility, adaptability and performance, while the goals of long life, compactness and efficient operation remain. For example, some typical modern process tools include more than one unit, such as a process chamber, with each of these having a number of different subunits, each to be brought to and maintained at preset temperature levels. In some of these tools, there may be common settings for like subunits, while other subunits there may be no commonality among the desired settings. Holding temperature at the given levels may require substantial cooling capacity, or only moderate cooling capacity, or even the addition of heat energy. Thermal exchange capacity, usually expressed here in terms of kilowatts, is necessarily a function of both temperature and flow rate.

Overall, the requirements at a semiconductor fabricating facility may differ such that the specified temperature levels can vary from very cold (e.g. down to −40° C.), to within a moderate temperature range (e.g. 0° C. to 40° C.), or to a higher temperature (e.g. up to about 120° C. for semiconductor fabrication houses). Moreover, the thermal demand, in KW, may also be substantially different, meaning that the capacity of a compressor or pump, for example, may have to be high for one installation but can be much lower for another. Sometimes one control unit may have sufficient thermal capacity for a number of subunits. In other user environments the temperatures to be maintained may be at more extreme temperature limits, or there may be special needs for varying temperatures within specified time periods.

For most practical applications in the semiconductor fabrication industry, temperature is controlled by circulating a thermal transfer fluid through a cluster tool subunit and back to the temperature control unit, with the user specifying the temperature and flow rate needed. The thermal transfer fluid is typically an equal mixture of ethylene glycol and water, or a proprietary fluid, such as that sold under the trademark "Galden". These both accommodate very wide differentials between freezing and boiling levels, and have viscosity characteristics which tolerate pumping force differences within the operating temperature limits.

To meet these varied requirements with a compact, low footprint unit is not enough, since it is also desirable to maintain the subunit temperatures while using minimal amounts of energy without losing the flexibility needed to meet temperature level and flow rate requirements for a substantial number of subunits. Cooling solely by air is seldom a viable option. The cheapest available temperature control medium is facilities (utilities) water, for example, which suffices for cooling down to a limited intermediate temperature range somewhat above that of the water itself. For greater chilling capacity, a pressurized refrigerant can be used, while for heating an external thermal energy source, such as an electrical heater, can be employed. Providing appropriate thermal energy solutions for a variety of coexisting needs and at the same time using a compact, high reliability and low energy demand configuration, however, presents problems that have not heretofore been satisfactorily resolved.

SUMMARY OF THE INVENTION

In a temperature control unit in accordance with the invention, separate modules of like or related form factors are received in a control chassis, there being at least two broadly distinguishable module types each having at least two different temperature control capabilities, and each with energy savings potential. The modules each have their own pump and reservoir for thermal transfer fluid, an energy efficient unit providing a cooling medium, a heat exchanger or exchangers for transfer of thermal energy between the cooling medium and the transfer fluid, and at least one element for heating the thermal transfer fluid. These modules themselves can be modified while remaining consistent with the defined form factor by the use of differently powered compressors, different capacity pumps, differently sized reservoirs, or more than one heat exchanger. Flow rates as well as thermal load capacities can be adapted or revised to service individual or multiple subunits.

This versatile module-based approach offers a variable array of functionalities to confront the individual needs of multiple operative subunits. Self contained refrigeration loops with thermal transfer fluid reservoirs and pumps enable extraction of heat from a substantial but accommodatable fluid volume in order to cool a process tool. Since the modules can be used in different combinations and internally varied as well, they can be both individually tailored and flexibly responsive to multiple needs on an overall basis. The heat removal rate requirements, which are changeable, of a variety of process tools, can thus be confronted by appropriate module sets, each adapted to meet the temperature level and flow rate needs of individual subunits in the process tools. The basic module types, used in combination, enable control from cooling at low temperatures to heating at relatively high temperatures.

In one type of module, for example, a refrigeration unit is arranged such that compressor energy in a refrigeration loop including an evaporator/heat exchanger can either cool or heat the thermal transfer fluid. This module type cools by expanding pressurized refrigerant in the refrigeration loop or heats using pressurized hot gas from the compressor in a hot gas bypass loop. Heating may additionally be supplied or augmented using the separate heating source in a thermal transfer fluid loop. Thus temperatures can be maintained at different individual prescribed levels with superior energy efficiency in each instance. A second control module type uses a liquid/liquid heat exchanger which receives facilities water as well as thermal transfer fluid, and varies the facilities water flow for mid-range cooling of the process tool unit or subunit. The facilities water flow rate is regulated by a temperature responsive flow control valve combination receiving a control signal from the system. The separate heating source in this unit corrects the thermal transfer fluid temperature rapidly, or independently heats the fluid to a selected higher level.

The entire system is advantageously processor controlled, and includes sensors for detecting the actual thermal transfer fluid temperatures in the different channels that are individually controlled by the modules. A touch screen display enables an operator to enter prescribed operating temperatures and changes, and to review operating values, including fluid flow rates. The physical system configuration is such that a chassis can receive one or more temperature control modules that are integrally sized relative to the standard form factor, such that they removably fit into matingly configured supports or receptacles in the chassis. The modules can be arranged in vertical and/or horizontal arrays, and include front end panels which provide access for adjustments, fluid filling, and draining. Backend panels provide supply and return ports for conduction of thermal transfer fluid through the process tools, and may include couplings for utilities water and electrical power. They also typically include manifolds for coupling thermal transfer fluid lines in common to more than one subunit to be held at the same temperature.

Where a larger compressor or reservoir is to be utilized, this can be accomplished with a module that is a multiple of the standard form factor in width while still being compatible with the control chassis. Where refrigeration capacity needs are less, the refrigeration loop may be simplified as by elimination of features such as a subcooler. If no utilities water is available for cooling, the condenser in the cooling loop may be of an air cooled type. Air conditioning type compressors are typically used, at considerable savings in system cost.

In a specific example of a versatile cooling and heating module, the pressurized refrigerant from the compressor is, for lower temperature chilling applications, liquefied in the condenser and provided through a solenoid controllable expansion valve and a subcooler to an evaporator/heat exchanger, from which expanded refrigerant is returned to the compressor input via the subcooler. The same unit can also be used to heat, moreover, by using a bypass loop from the compressor that is opened when the refrigerant loop conduit is closed at the solenoid expansion valve. Under this condition hot gas refrigerant is directed via a hot gas bypass valve into the evaporator/heat exchanger, heating the thermal transfer fluid to the range of as much as 120° C. This bypass loop from the compressor output proceeds through the hot gas bypass valve which opens in response to low pressures at the input to the compressor such as occur automatically when the solenoid expansion valve is shut off. The hot gas bypass loop also safeguards the compressor by returning refrigerant flow to the compressor input when greater input pressure is needed. Advantageously, the hot refrigerant gas is also directed through the reservoir for thermal transfer fluid to increase the temperature of the body of thermal transfer fluid. If desired, the thermal transfer fluid temperature can be increased further or brought more quickly to temperature by activating the electrical heater in the thermal transfer fluid line. This module also may use other expedients, such as employing a desuperheater valve responsive to compressor input temperature to divert a part of the liquid refrigerant from the condenser output to the return input at the subcooler, thus lowering the temperature of the return flow to the compressor.

Additionally, a novel differential pressure valve can be connected into a shunt tubing between the outgoing and return flows of the thermal transfer fluid loop, to prevent over-pressurization by the pump, which particularly can occur with regenerative turbine pumps. A useful indication of the flow rate of thermal transfer fluid is also obtained by a novel flowmeter in one of the lines that is responsive to pressure differentials across an internal orifice. Flow rate readings are often desired by process tool users, if obtainable without undue cost, and reliable over a substantial time period.

For efficient mid-range cooling and alternatively for heating, temperature control can be by controlling facilities water flow using the pressure of gas pressure in an enclosed volume, as determined by a control signal applied to an electrical heater. By signal-regulating the gas pressure in this way, the system opens or closes a pneumatic pressure response flow control valve that controls facilities water flow as needed for regulated cooling of the thermal transfer fluid in a heat exchanger. If the temperature is temporarily lowered too much, it can be brought back up quickly using the electrical heater in the thermal transfer fluid loop. The same heater can be used independently to heat the thermal transfer fluid to a prescribed level. The thermal capacity of this heater (in KW) can be arbitrarily selected by choice of heating elements. The pneumatic controller for the flow control valve includes a gas containing volume thermally coupled to a heater on one side and thermally insulated to a selected degree from the water reference line, to reduce the energy need when heating the bulb and limit the cool down rate when the heater is deenergized.

A novel differential pressure valve in accordance with the invention is virtually noise free and at the same time stable and reliable, and useful to prevent over-pressurization of the thermal transfer fluid loop. It incorporates a spring loaded flexible quill that supports a valve head at one end and merges at the other end into a dashpot slidable within a piston. The valve head is urged by a spring about the quill toward closure against the end face on a conduit for high pressure flow. An adjustment screw, which can be accessible from the exterior of the module, controls the axial position of the piston and therefore the valve opening pressure. The valve opens an exit path from the high pressure conduit to relieve pump pressure by diverting flow to the return line. The flexible quill and dashpot arrangement assures virtually silent operation by damping valve vibrations.

A flowmeter operable with this system comprises a differential capacitive transducer which is coupled to ports on the thermal transfer fluid line that are on the opposite sides of an orifice plate in the fluid flow path. The differential in pressure across the orifice flow path, corrected for flow and viscosity changes by an associated square root circuit, provides an accurate measure of the flow rate that is linear, precise and free from long term drift.

DESCRIPTION OF THE DRAWINGS

A better understanding of the invention may be had by reference to the following description, taken in conjunction with the accompanying drawings, in which:

FIG. 4 is a simplified sectional view of a temperature controlled pressure responsive water flow control valve in accordance with the invention;

FIG. 5 is a perspective view, partially broken away, of a temperature controlled variable pressure generator for the valve of FIG. 4;

DETAILED DESCRIPTION OF THE INVENTION

Figure 1:
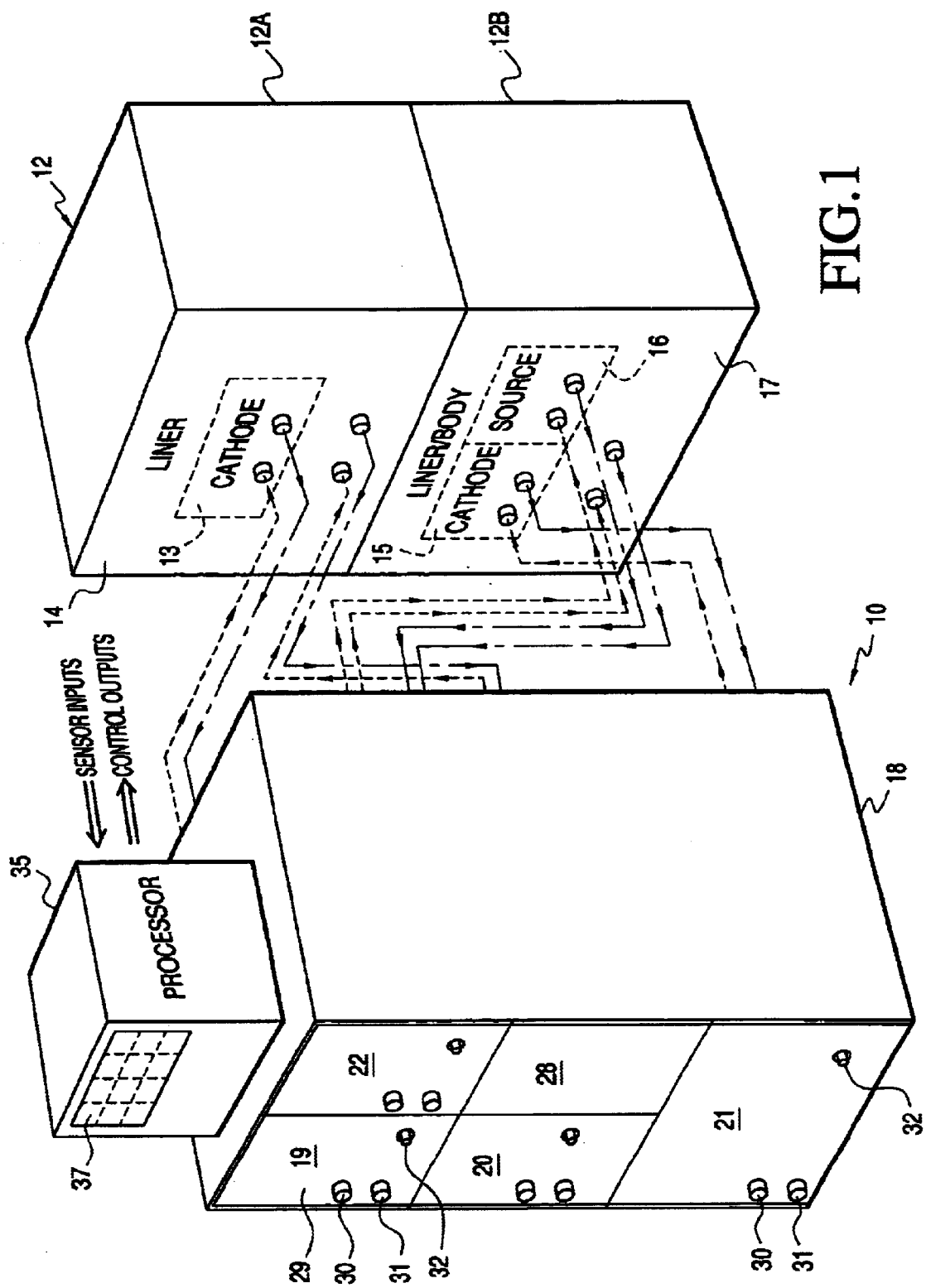
FIG. 1 is a perspective block diagram view of a multiple modular installation of temperature control units as arranged in association with a process tool system including a number of subunits which are each temperature controlled.

FIG. 1 depicts in broad form one typical arrangement of a modular multi-function temperature control system 10 which supplies flows of thermal transfer fluid at specified temperatures and flow rates to separate subunits, or separate tools, of a process tool system 12, depicted generically. A typical process tool 12, such as a cluster tool for semiconductor fabrication, is chosen as the example since it represents a demanding and widespread application. However, the process tools that can be serviced by a temperature control system may vary widely in number, design and the control functions that must be performed, and this applies also within the field of chip manufacture as well. The semiconductor fabrication tool 12 that is depicted in idealized and simplified form in FIG. 1, for example, is for processing 300 mm wafers, and includes separate tools 12A and 12B, each having more than one subunit. The tools 12A and 12B are shown stacked, which is not a likely disposition in practice but is illustrative of the fact that since the temperature controls and subunits are interconnected only by supply and return lines there is no necessary geometrical relationship between them. Here the first (upper) tool 12A has a cathode 13, to be maintained at −20° C. to 60° C. with 1000 W of heat removal required, and a liner 14 to be held at +15 to 60° C. with a heat load requiring 800 W of heat removal. In the second tool 12B, the subunits are a cathode 15 to be held at −20 to 60° C. with a 3000 W heat removal, a source 16 requiring 2000 W of heat removal at +40 to 80° C. and a liner/body 17 having a heat removal load of 500 W. In the first unit 12A the pump rates (assuming the use of 50/50 ethylene glycol/water mixture) are 1.0 PGM at 80 psi for the cathode 13 and 0.075 GPM at 80 psi for the liner 14. At the second unit 12B the flow for the cathode 15 is 3.0 GPM at 80 psi, for the source 16 is 2.0 GPM at 80 psi and for the liner/body 17 is 0.5 GPM at 80 psi.

Two different module types, and three different configurations of modules, are mountable in a movable chassis 18 to meet these needs. For the first unit 12A a low temperature chiller module 19 of 3.0 KW cooling power is adequate for the cathode 13, while a mid-temperature chiller module 20 of 3.6 KW cooling power can be used for the liner 14. These are installed, in FIG. 1, in the left upper and middle tiers of the chassis 10. The second unit 12B requires 10.0 KW cooling power for the cathode 15, which is obtained from a double wide chiller module 21, depicted in the lowest tier of the chassis 10. Both the source 16 and the liner/body 17 are controlled by the same channel, supplied by a water-cooled heat exchanger (HEX) module 22, installed at the right side of the upper tier.

Fluid in each recirculating thermal transfer fluid loop is supplied from a module to the associated subunit by a supply line 24 (dotted line), and the individual loop is completed by a return line 25 (dot-dash line). The modules incorporate supply and return manifolds so that more than one recirculating loop can be serviced. Only two of these lines 24, 25 are specifically numbered inasmuch as each pair serves the same purpose for the subunit it controls. Facilities water supply and return lines, and the electrical power supply lines, are not shown in FIG. 1 but may be coupled into the back end of the chassis 16, as will be evident below in relation to individual modules.

In the temperature control system 10, the modules are interchangeably mounted in receptacles 28 in the mobile control chassis 18 to form an array of given total height, width and length. By way of example, one receptacle 28 is shown empty. The modular units are based on a standard form factor, in height, width and length, although width may be doubled, as seen in FIG. 1, relative to the basic form factor, where more interior volume is needed for a module. Sliders and engagement devices (not shown) within the chassis 18 are included in the sides and bottoms of the receptacles 28 for matingly receiving the modular units. Slides or roller supports for the modules may be conventional and therefore are not shown in detail.

FIG. 1 illustrates a three high configuration of the different modules 19, 20, 21 and 22. The upper HEX module 22 on the right side is paired in side by side relation to the low temperature chiller 19, while the mid-range chiller 20 is in the middle tier next to an open receptacle 28 and the lowest level tier is occupied by the double width module 21. Each module has a face plate 29 which includes accessible fill and drain lines 30, 31 respectively for thermal transfer fluid, and a control shaft 32 for adjusting the pressure threshold setting of an internal differential pressure valve, to be described below. The modules 19–22 each include conventional electrical circuit connectors (not shown in FIG. 1) for coupling into power lines and signal circuits in the chassis 18, either by manual attachment or plug-in couplings on insertion of the module into its receptacle. Signal carrying circuits which intercouple sensors and controllable elements in the modules to an associated processor may be completed in the same manner, during or after insertion.

The signal circuits couple to a control processor 35, for storing prescribed or setpoint commands for the different control channels, receiving various sensed actual temperature values from the modules 19–22, and also supplying control signals to temperature-controlling components in the modules. A touch screen display 37 functioning with the processor 35 enables an operator to enter and adjust the setpoints and to observe actual operating temperatures and flow rates. The examples of FIG. 1 depict how different capabilities within a set of modules 19–22 can control subunits 13–17 in different parts of a cluster tool 12, with capabilities also being available for different or added subunits. The output of one module which has adequate flow rate and heat capacity also can be manifolded to two or more subunits, as described below.

In the example of FIG. 1, a module 22 in the upper tier of the chassis 18 is coupled in common to maintain the source 16 and liner/body 17 of the lower cluster tool 12B at 40° C.–80° C. The heat removal demand of a specific temperature in the range can be met by a single heat exchanger (HEX) module 22 using facilities water (typically about 20° C.) as the cooling medium. The cathode 15 in the same tool 12B, which must be cooled to a lower temperature extending down to −20° C., is serviced by a single 10 KW (compressor power) refrigeration module 22. This compressor is large enough that a larger platform, equal in extent to two of the smaller platform is required. This larger size module, 21, is called a "double-width" module. It is shown installed in the lowest tier of the chassis 18.

The HEX module 21 may be described as a dual mode, midrange unit for both cooling and heating. In cooling, it provides up to 40 KW, at about 20° C. over the temperature of the facilities or utilities (these words are used interchangeably herein) water used for cooling, at a flow rate of 3 gpm to 15 gpm at 100 psi. In contrast, the double width refrigerating or "chiller" module 21 provides 10–50 KW cooling capacity, dependent on compressor power (7.5 to 15 hp) and the temperature to be maintained. Thus it provides thermal capacity up to 12 KW of −40° C., or up to 50 KW at +20° C., with flows from 8 gpm to 25 gpm at 100 psi. The upper tool 12A has a cathode 13 which is cooled in the range of −20° C. to +60° C. by a low temperature chiller module 19 providing 3000 W of heat removal capacity at −20° C. In one practical installation the actual heat removal demand is 10000 W. A liner 14 for the same tool 12A is cooled by a mid-range temperature chiller module 20 providing a capacity of 2400 KW at +10° C. but requiring only 800 W in the given example.

Figure 2:
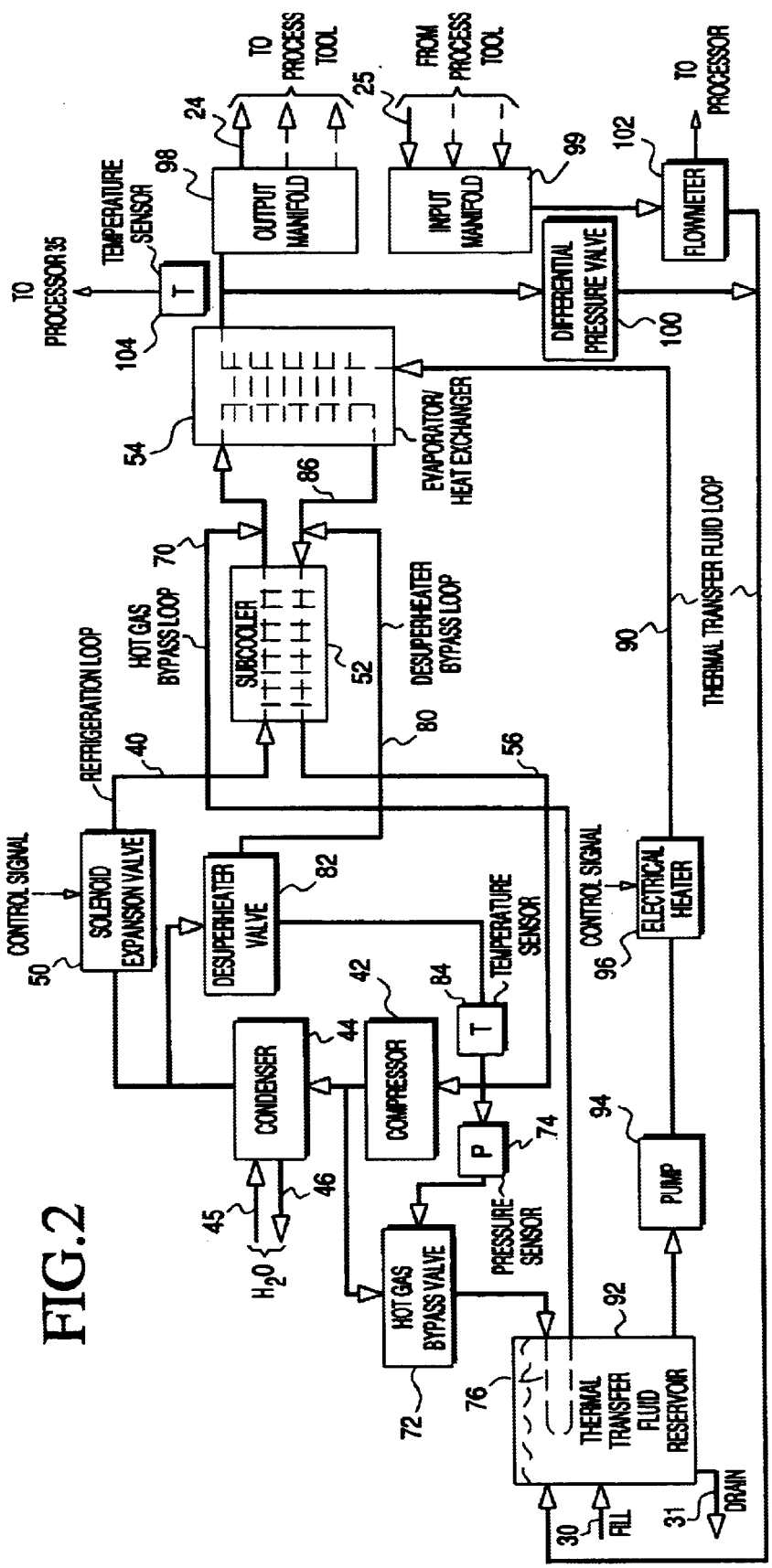
FIG. 2 is a simplified block diagram of a module using a refrigeration loop for both heating and cooling.

The refrigeration or chiller modules 19, 20 and 22 referenced broadly in FIG. 1 comprise, as shown schematically but in greater detail in FIG. 2, a refrigeration loop 40 which circulates an accepted environmentally compatible refrigerant that is pressurized by a compressor 42 of chosen capacity. The compressor 42 can be a production version air conditioning-type compressor that is available in quantity and at relatively low cost. Pressurized hot gas from the compressor 42 is cooled in the condenser 44 with utilities water, typically at about 20° C., provided via an input line 45 circulated through the condenser 44, and returned via an H$_2$O output line 46. The pressurized cooled and liquefied refrigerant is regulated by a solenoid expansion valve 50 that operates with variable duty cycles in response to control inputs from the processor 35. That is, the valve 50 is turned on for a selected fraction of each successive time interval (typically 2–5 seconds). Commercially available valves of this type recommend 6 second cycles for 10 year life expectancy, assuring long term reliability. In the refrigeration loop 40, the regulated flow brings the thermal transfer fluid to a chosen temperature, which is to be essentially uniform throughout the system including the process tool. From the valve 50, flow is directed to one input of a subcooler 52, where the refrigerant is further cooled in heat exchange relation to refrigerant returning on a suction line 54 from an evaporator/heat exchanger 54, prior to interchange of thermal energy with the thermal transfer fluid. The return flow on the suction return line 56 is input to the compressor 42, at an increased but still acceptable temperature.

The refrigeration unit also includes a hot gas bypass loop 70, which extends from the compressor 42 output into a point in the refrigeration loop 40 that is prior to the evaporator/heat exchanger 54, and thereafter enters the suction line 56. A hot gas bypass valve 72 in the loop 70 opens in response to low pressure signals from a pressure sensor 74 coupled into the suction line 56 at the compressor 42 input. The valve 72 is opened when the pressure is below a preset level, to divert a proportion of flow from the compressor 42, as when the system does not require refrigeration and the solenoid expansion valve 50 is closed. Under these conditions, the compressor 42 output temperature for a 5 hp compressor is in the range of up to 250° F. (~121° C.) with 3 KW output. This hot gas from the bypass loop 70 is thus effectively made useful for a heating mode at the evaporator/heat exchanger 54. The hot gas bypass loop 70 coupled into the input to the evaporator/heat exchanger 54 is first diverted through a preheat path segment 76 in the reservoir (described below) for the thermal transfer fluid, which flow raises the temperature of the thermal transfer fluid appreciably before subsequent heat exchange. The flow then passes into the input line between the subcooler 52 and the evaporator/heat exchanger 54, to employ that exchanger in a heating rather than a cooling mode. The hot gases also serve to drive oils contained in the refrigerant through the evaporator 54 passages, preventing oil from being trapped because of slow refrigerant flows.

For reliability and greater efficiency the refrigeration system also includes a desuperheater bypass loop 80 in which a desuperheater valve 82 couples pressurized refrigerant from the output of the condenser 44 to the return path input 86 to the subcooler 52. The desuperheater valve 82 is responsive to levels sensed at the input to the compressor 42 by a temperature sensor 84, and opens to divert initially pressurized liquid flow back to the input via the subcooler 52 when needed. After expanding in the subcooler 52, the returning refrigerant both lowers the temperature of the principal refrigerant flow at the compressor 42 input and increases the compressor 42 input pressure.

Control of the temperature of thermal transfer fluid is effected in a fluid loop 90, which includes a reservoir 92 retaining a volume of the fluid, the level being maintained above a minimum, if necessary during operation by using the fill line 30. The level may also be diminished (or flushed completely) by use of the drain line 31. Spring action valves (e.g. Schrader-type valves), that are accessible from the module exterior, can be employed for this purpose. In the thermal transfer fluid loop 90 fluid is drawn from the bottom region of the reservoir 92 by a pump 94 and directed through a controllable electrical heater 96 in the flow path (a heater alternatively may be external to the conduit) and which operates under control signals from the processor 35. The fluid loop 90 proceeds through the evaporator/heat exchanger 54 for the fluid to be cooled or heated as appropriate, and the thus temperature adjusted thermal transfer fluid is then supplied to an output manifold 98. One supply line 14 or a number of supply lines (as shown) from this output manifold 98 couple the thermal transfer fluid to the associated subunit or subunits of the process tool. After circulation through the process tool, thermal transfer fluid in one or more of the return lines 25 flows into an input or return manifold 99 and then is fed back through a flowmeter 102 to monitor actual flow rates before delivery back into the reservoir 92, as on the display screen on FIG. 1. The flowmeter 102 can advantageously be disposed at the return manifold 99 with greater economy of parts. The electrical heater 96 provides a fast response capability for correcting or shifting the fluid temperature level when a higher temperature is needed. A heater of 1000 W to 12,000 W power level is usually employed, depending on operational needs.

The pump 94 is, most typically, of the regenerative turbine type, and generates substantial pressure in the thermal transfer fluid. In the event that this pressure becomes excessive, an adjustable pressure valve 100 in shunt between the supply and return lines in the thermal transfer fluid loop 90 is caused to open at a selected threshold value. The valve 100 diverts high pressure in fluid on the supply side into the lower pressure return system and thus precludes generation of excessive pressure in the system. Since the requirements of the process tool are only that the output temperature of the thermal transfer fluid and its flow rate be at prescribed values, output temperature is measured by a temperature sensor 104 after the evaporator/heat exchanger 54.

As a chiller system, a modular system 19, 20 or 21 operates substantially conventionally with compression, condensation and heat exchange to deliver refrigeration capacity at chosen temperatures and flow rates. For models using compressors of 1.0–5.0 hp, refrigeration outputs for up to 3 KW at −40° C. and up to 15 KW at +20° C. can be supplied, at flow rates of 4 gpm to 25 gpm at 100 psi. The refrigerant flow through the subcooler 52 into the evaporator/heat exchanger 54 boils off at a rate needed to lower the temperature of the thermal transfer fluid to the level needed at the manifold 98. Control is achieved by sensing the actual temperature of the thermal transfer fluid at a suitable location, such as just prior to the output manifold 98, and using this signal in the processor 35 to make the necessary correction of refrigerant flow by changing the open cycle time of the solenoid expansion valve 50. The solenoid expansion valve 50 controls temperature with stable, long life performance, but analog expansion valves can alternatively be employed, usually at some added expense.

The desuperheater valve 82 includes a thermal expansion valve that responds to undesirably high temperature levels at the compressor 42 input to open the shunt path 80 from the condenser 44 output, and to direct this flow into the suction path 56 returning to the compressor 42, thus maintaining compressor input temperature at an adequate level.

If the process tool requires heating in a midrange, i.e., within the power capacity of the compressor 42, then the solenoid expansion valve 50 can be shut down and compressor energy used for heating the refrigerant as hot gas, which is directed through the hot gas bypass loop 70 via the hot gas bypass valve 72 to the output flow on the refrigerant side of the subcooler 52. Bypassing this hot gas flow through the reservoir 92 and into the input line to the evaporator/heat exchanger 54 maintains continuous flow and precludes accumulation of refrigerant oils in the passages of the evaporator/heat exchanger 54. This alternative dual use of compressor energy contributes both to energy efficiency and unit compactness. Furthermore, the temperature of the thermal transfer fluid may cumulatively be heated to a chosen higher level by energizing the electrical heater 96. The heater 96 alone can be used to restore the temperature of an overcooled or underheated fluid, provide rapid change of temperature increase, or establish a temperature of greater than 120° C., as required by system demands. The last alternative represents the highest temperature mode, for which a high capacity (e.g. >10 KW) electrical heater can be used.

Figure 3:
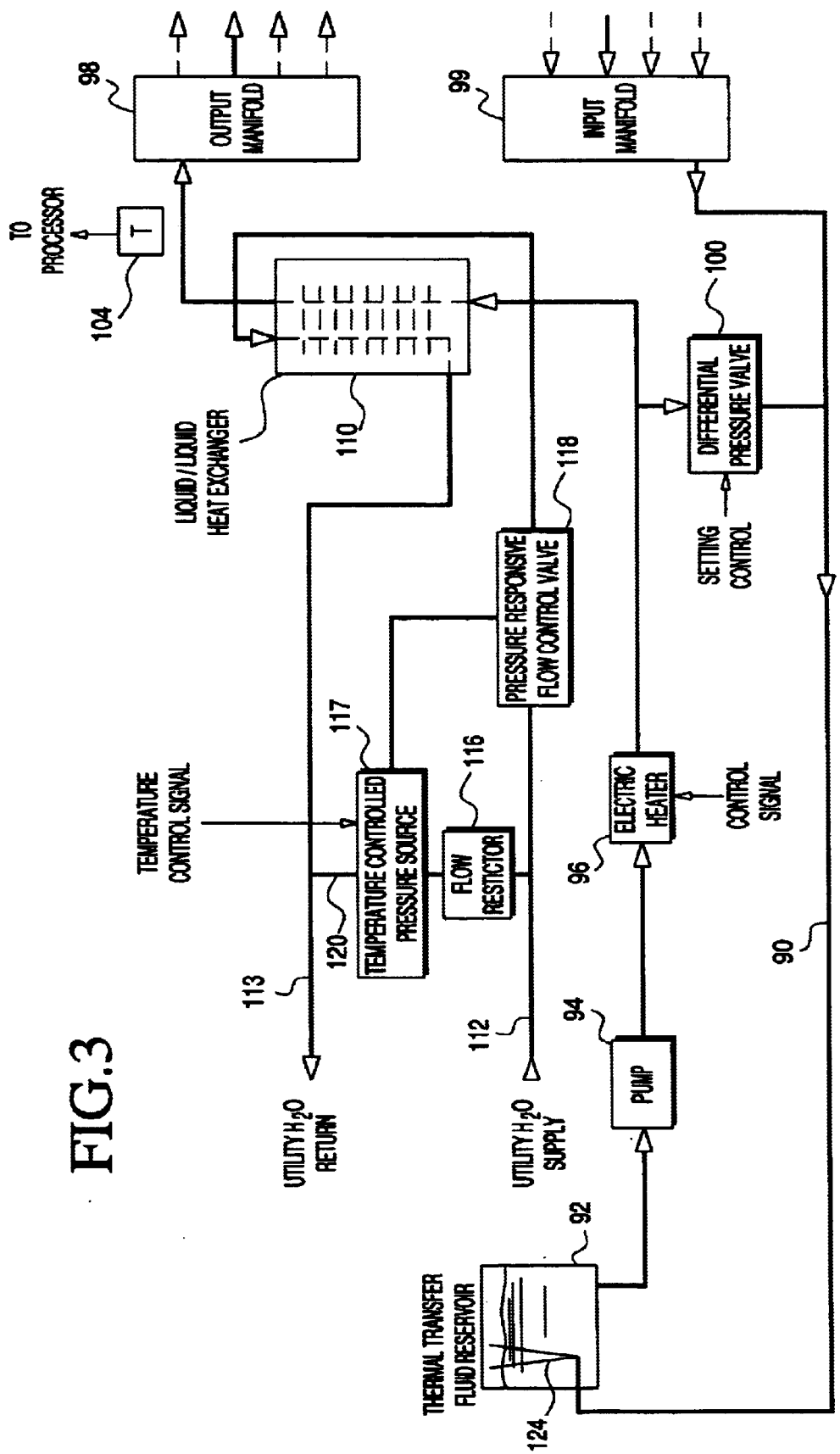
FIG. 3 is a block diagram of a temperature control module using facilities water for cooling.

The example of FIG. 3, to which reference is now made, provides a dual mode cooling and heating system primarily for midrange cooling operation above the temperature range of facilities water, but incorporating a heating range capability as well. In this system, the recirculating loop 90 for thermal transfer fluid is similarly arranged to that of the system of FIG. 2, and consequently the relevant components are similarly numbered. The heat exchanger 110 is a liquid/liquid heat exchanger of the counterflow type, in which thermal transfer fluid traverses one flow path in thermal exchange relation to facilities water, in an adjacent second flow path. This system functions to cool the thermal transfer fluid to a temperature of within about 20° C. of that of the facilities water. The water supply line 112 is directed into and through the counterflow heat exchanger 110 to a water return line 113. In the water supply line 112 path, flow is controlled by a pneumatic pressure responsive valve 118 which is controlled by a temperature responsive pressure device 117 that receives control signals from the processor. The temperature responsive device 117 is also in thermal contact with a water reference line 120 which shunts the water supply and return lines 112, 113 respectively, and the flow through which is limited by a flow restrictor 116. This apparatus for flow control is described in greater detail in conjunction with FIGS. 4 and 5 below. Within the reservoir 92 for the thermal transfer fluid, return flow is injected via a diffuser 124 to limit the turbulence and dispersion induced by high flow rates. The diffuser 124 is a known arrangement using a 6° diverging cone to attenuate flow velocity in stable fashion.

The cooling system of FIG. 3 provides a desired thermal transfer fluid temperature by regulating the flow rate of the facilities water, the source temperature of which is effectively constant. When the temperature of the thermal transfer fluid is too high relative to a preset level, as sensed by the temperature sensor 104 responsive to the flow to the output manifold 98, the processor of FIG. 1 generates an error control signal that is applied to the temperature responsive pressure device 117. That pressure, within an enclosed gas volume, is communicated to the pressure responsive flow control valve 118, to cause it to enlarge or decrease the opening, increasing or decreasing the flow of cooling utilities water thereby and consequently lowering the temperature of the thermal transfer fluid at the heat exchanger 110. Close temperature control can be maintained because of the mass of the thermal transfer fluid, and because the electrical heater 96 in the thermal transfer fluid loop can be energized to bring the thermal transfer fluid back up to temperature rapidly in the event that it has been cooled too much. Alternatively, the electrical heater 96 may be used alone, if the temperature needs to be maintained at a high level. The Hex module offers multiple capabilities for meeting temperature control demands for one or more subunits in a process tool.

A more detailed example of the water flow control is shown in FIGS. 4 and 5, to which reference is now made. At the water reference line 120 that couples a reduced flow between water supply and return lines, a section is adjacent a spaced apart electrical heater 130 responsive to signals from the processor of FIG. 1. The electrical heater 130 is in contact with interposed thermally conductive material 132, such as aluminum, which also conducts heat to a control valve sensor bulb 134 that confines a pressurized gas and is disposed between the heater 130 and the reference line 120. A pressure conduit 135 from the bulb 134 leads to a pressure chamber within the pressure responsive flow control valve 118 in the water supply line 112. An encircling retainer 138, such as a strap or housing holds the elements 130, 132 and 120 in close and stable relation. A control layer of thermal insulation 140 is interposed between the bulb 134 and reference line 120 to minimize the power needed from heater 130 to heat bulb 134 to the temperature required for control. The thickness and thermal conductivity of the insulation are chosen to give a good compromise between rapid heatup of bulb 134 with limited power from heater 130, and rapid cooldown in the absence of heater power.

The flow restricting valve 116 in the reference line 120 (not shown in FIG. 5) limits the flow that shunts between supply and the return line, because flow that is only enough to be adequate for a water temperature reference is needed. The flow control valve 118 has a valve body 142 with ports for the incoming supply and for the outgoing controlled flow. In the body 142, a slidable valve element 143 having a seating surface 144 is biased along a chosen axis by a compression spring 145 engaged by an adjustable insert 146 in the body 142. A shaft along the axis from the valve 143 extends from an exterior end into a chamber defined by a hollow housing 147 affixed to the valve body 142, and engages the midregion of a flexible diaphragm 148 that spans the chamber within the housing 147 also defines the limit of a variable pressure chamber on its opposite side. Pressure variations within the chamber are determined by the temperature of the bulb 134, the pressure being communicated through the conduit 135, and the diaphragm 148 flexes responsively, moving the valve 143 to provide a flow gap at the valve seat 144 when the threshold force set by the spring 145 is overcome. This threshold can be adjusted by axial adjustment of the threaded insert 143 so as to set the threshold operating pressure at which the pneumatic valve 118 opens by changing the static spring force value.

Reliability is of utmost importance in these systems, which are required to operate for long intervals without variation or maintenance. The method of control provided by the example of FIGS. 4 and 5 is free of both hysteresis effects and problems with system wear. In operation standby power is fed to the electrical heater 130 to maintain the bulb 134 at a specified elevated temperature and resultant pressure. When no cooling is needed, this standby power is not sufficiently high to open the flow control valve 118. To assure that the temperature of the sensor bulb 134 with standby power is less than that necessary to open the flow control valve, the spring 145 can also be adjusted in relation to the temperature of facilities water that is available.

Figure 6:
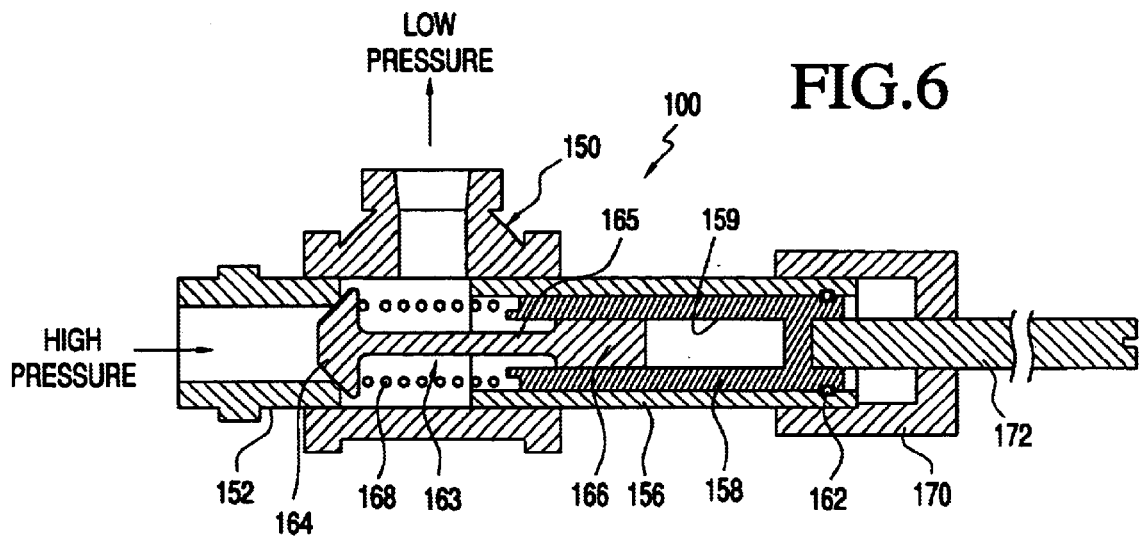
FIG. 6 is a side sectional view of a differential pressure relief valve in accordance with the invention.

In the systems of FIGS. 2 and 3, a differential pressure valve 100 is employed to prevent excessive buildup of pressure in the thermal transfer fluid that may be caused by the preferred regenerative turbine pump system. However, the differential pressure valve 100 is required to be adjustable and furthermore to be relatively free from the vibration and noise effects typically encountered with such valves. These results are achieved in a low cost and reliable fashion by the valve mechanism shown in FIG. 6, in which the elements are mounted on a Tee fitting 150 including an in-line end fitting 152 constituting an input for the high pressure supply flow line and a side arm that is coupled to the return line carrying reduced pressure return flow (after circulation through the process tool). At the opposite side from the end fitting 152, an in-line sleeve 156 coaxial with the high pressure supply line is engaged in the Tee 150, and supports within it a slidable piston 158 containing an interior hollow cylinder 159. Cylinder 159 is closed at its exterior end, and has an open end facing the interior of the Tee 150. An O-ring seal 162 between the piston exterior and sleeve 156 blocks leakage of the thermal transfer fluid during relative axial movement of the piston 150. The head 164 of an in-line valve 163 seats in the inserted nose end of the end fitting 152 when fully engaged. Along the valve 163, the valve head 164 is integral with a flexible elongated member or quill 165 extending from its opposite end to a dashpot piston 166 that fits and slides within the hollow cylinder 159. A compression spring 168 seated between the interior surface of the valve head 164 and the facing end of the piston 158 biases the valve head 164 against the facing nose end of the end fitting 152. The position of the piston 158 in the sleeve 156 is axially movable between limits, because an end cap 170 engaged to the exterior end of the sleeve 156 receives a threaded adjustment screw 172 that controls the axial position of the piston 158 and the compression of the spring 168. The adjustment screw 172 may be of significant length, so that, as seen in FIG. 1, it can extend outside of the face plate of the module to be axially adjustable by turning the screw 172 or an attached knob.

The fit between the dashpot piston 166 and the cylinder 159 is sufficiently close (about 0.05 mm) so that any vibration along the axis of the valve is damped by resistance to fluid flow. The quill 164 is thin enough to provide sufficient flexibility between the valve 162 and cylinder 159 to allow the valve to fit perfectly against its seat on the end fitting 152 when the valve is required to seal.

Figure 7:
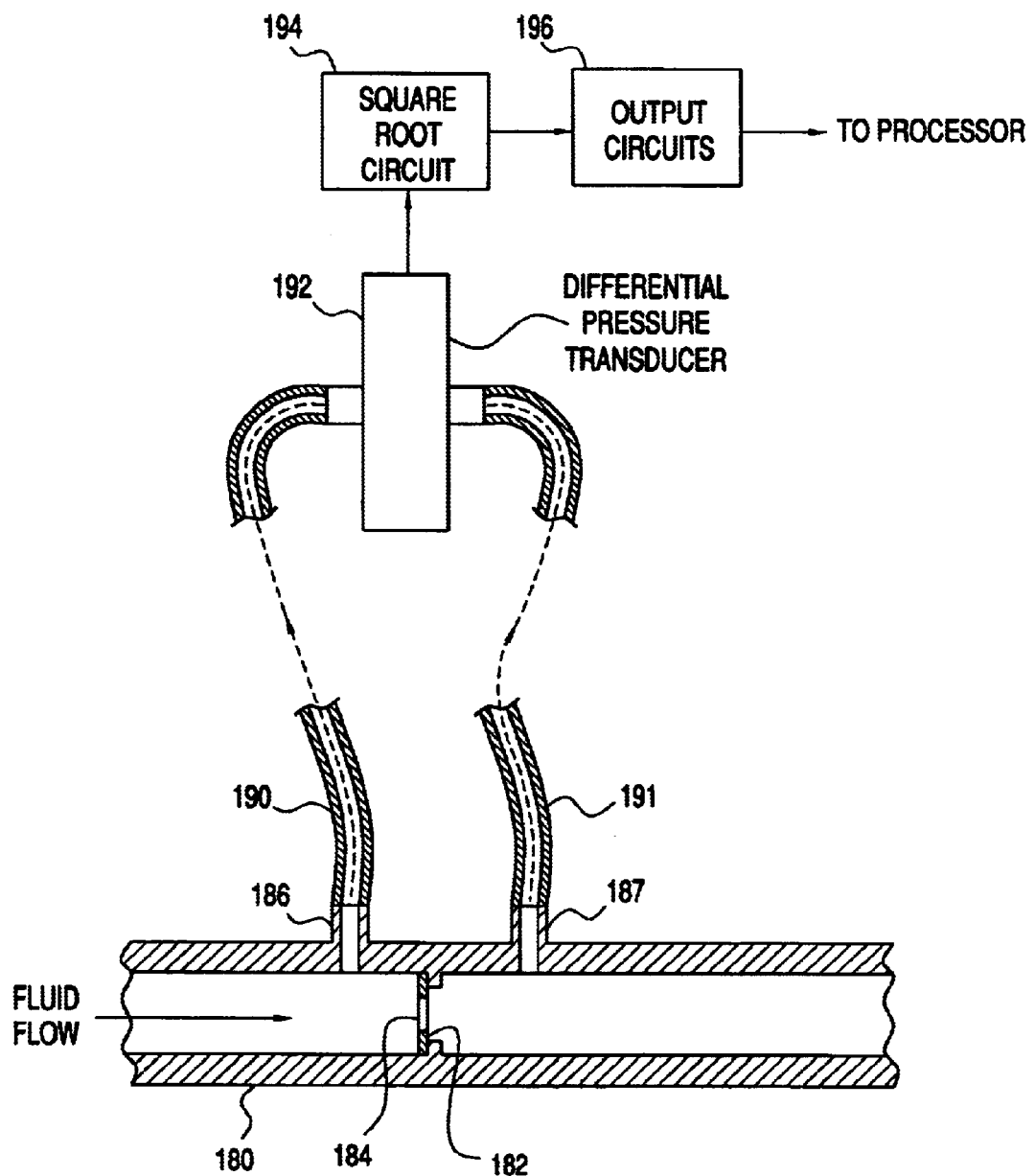
FIG. 7 is a combined side schematic and block diagram view of a flowmeter in accordance with the invention.

The measurement of flow of thermal transfer fluid in a system associated with a process tool is highly useful, because it provides a ready indication of normal operation both in the temperature control system and in the process tool. A significant change in flow rate may also denote the presence of obstruction or malfunction in the thermal transfer fluid flow paths. Given that the thermal transfer fluid can be raised to high temperature or lowered to low temperature, and therefore is subject to a wide range of viscosity changes, high resolution readings with various mechanical-based devices, such as paddle wheel type flowmeters, have been difficult to achieve and subject to inaccuracy over time. The arrangement of FIG. 7 provides a satisfactory answer to these problems, and can be used in any of a number of locations in the thermal transfer fluid conduit system. The conduit employed here is referred to generically as a flow tube 180 and is a linear section, although the flow reading may be taken at a junction or coupling as well. Within the flow tube 180 flow is impeded by an internal orifice plate 182 having a centrally disposed orifice 184 of sufficient area to introduce a pressure differential in the flows at its opposing sides. Pressure ports 186, 187 in the side walls of the flow tube 180 and on opposite sides of the orifice plate 182 are coupled by conduits 190, 191 to the opposite input of a differential pressure transducer 192 of a type widely employed in automotive and other pressure sensing systems. These transducers, which are available from different sources, are most often capacitive elements disposed on deflectable ceramic bodies which deviate from a nominal position in response to the pressure differential between flows on their opposite sides. The transducers generate signals that are sensitive, precise and linear, without being subject to hysteresis or drift effects.

The signal derived from the transducer 192 is a measure of the difference in pressure on the two sides of the orifice plate 182. However, the direct reading is not linear with flow. The pressure drop across an orifice is generally proportional to the square of the mass flowing through the orifice. In mathematical terms:

$$\Delta P = kM^2$$

where;

$\Delta P$ is the pressure drop k is a constant of proportionality

M is the flow in mass per unit time

The constant of proportionality, k, is an empirically derived constant that takes into consideration the flow velocity through the measuring orifice, density of the flow and transport properties of the fluid, mainly the fluid viscosity.

This relationship is compensated for electronically by a square root circuit 194. Additionally, circuit 194 is responsive to the fluid temperature and compensates for the variation of the proportional constant in the pressure-drop/flow relationship due to viscosity changes in the flowing liquid.

Figure 11:
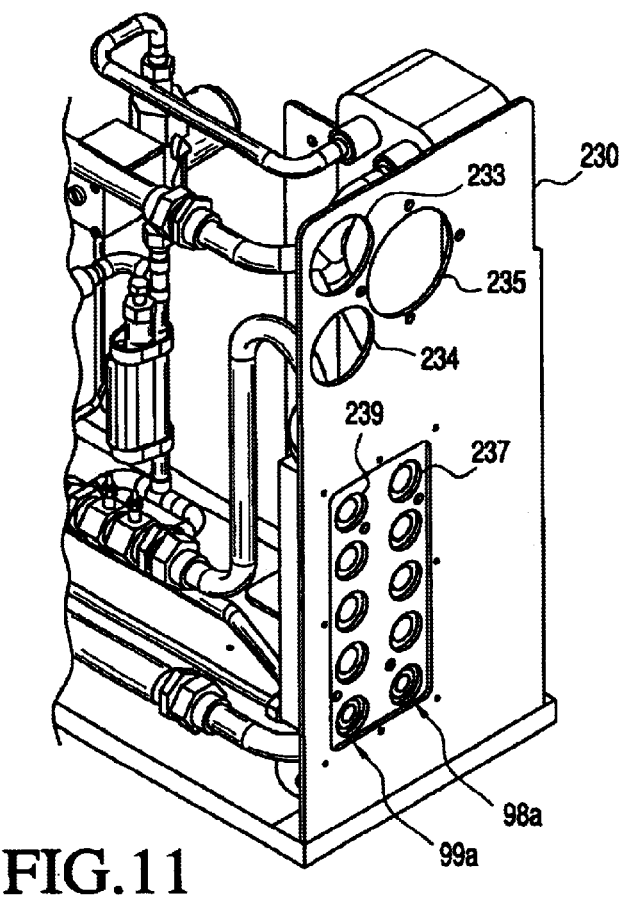
FIG. 11 is a fragmentary perspective view of a typical rear panel arrangement for modules in accordance with the invention.
Figure 8:
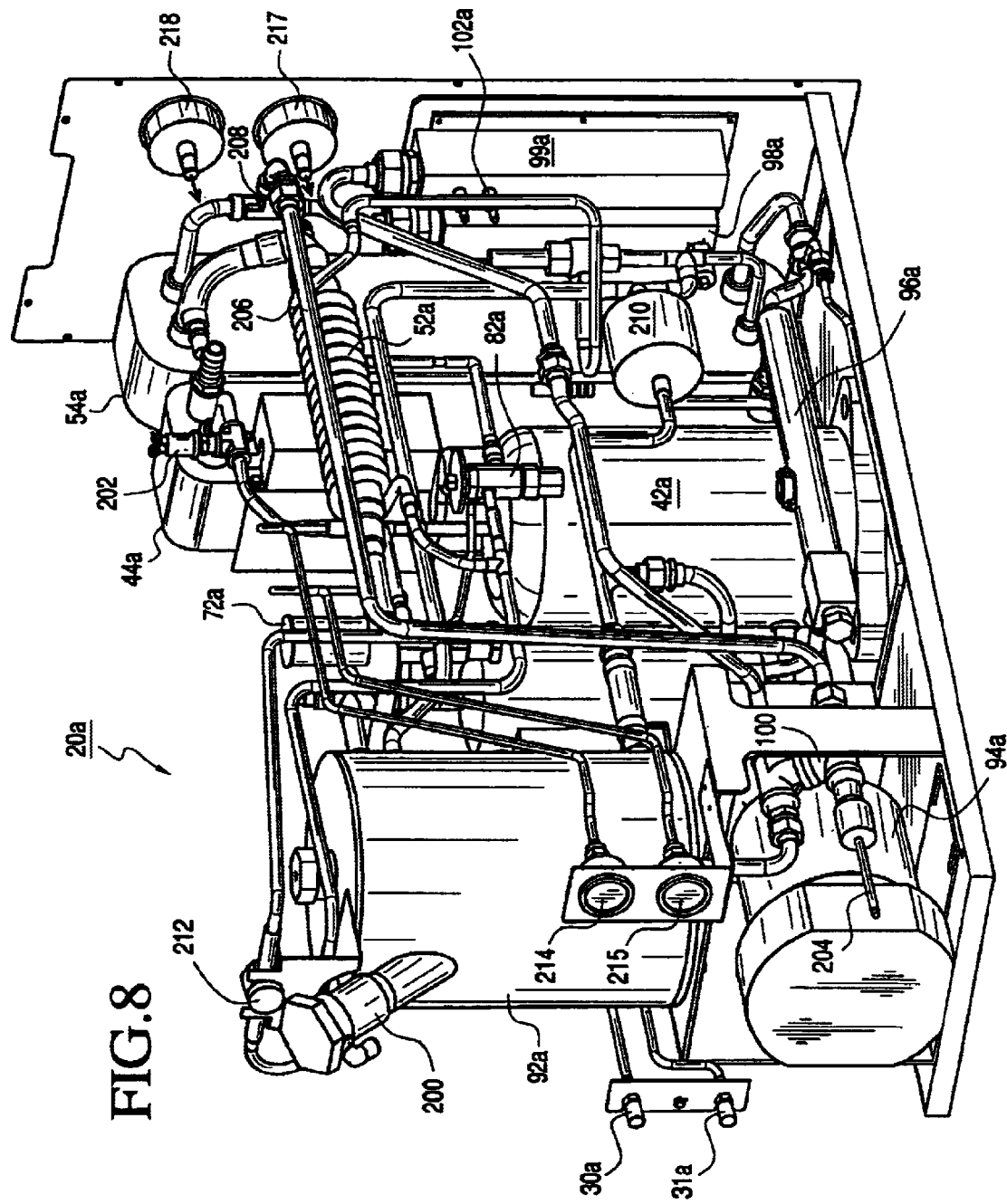
FIG. 8 is a perspective view of one arrangement of a practical module in accordance with FIG. 2 and employing a refrigeration loop having a 3.6 kw capacity.
Figure 9:
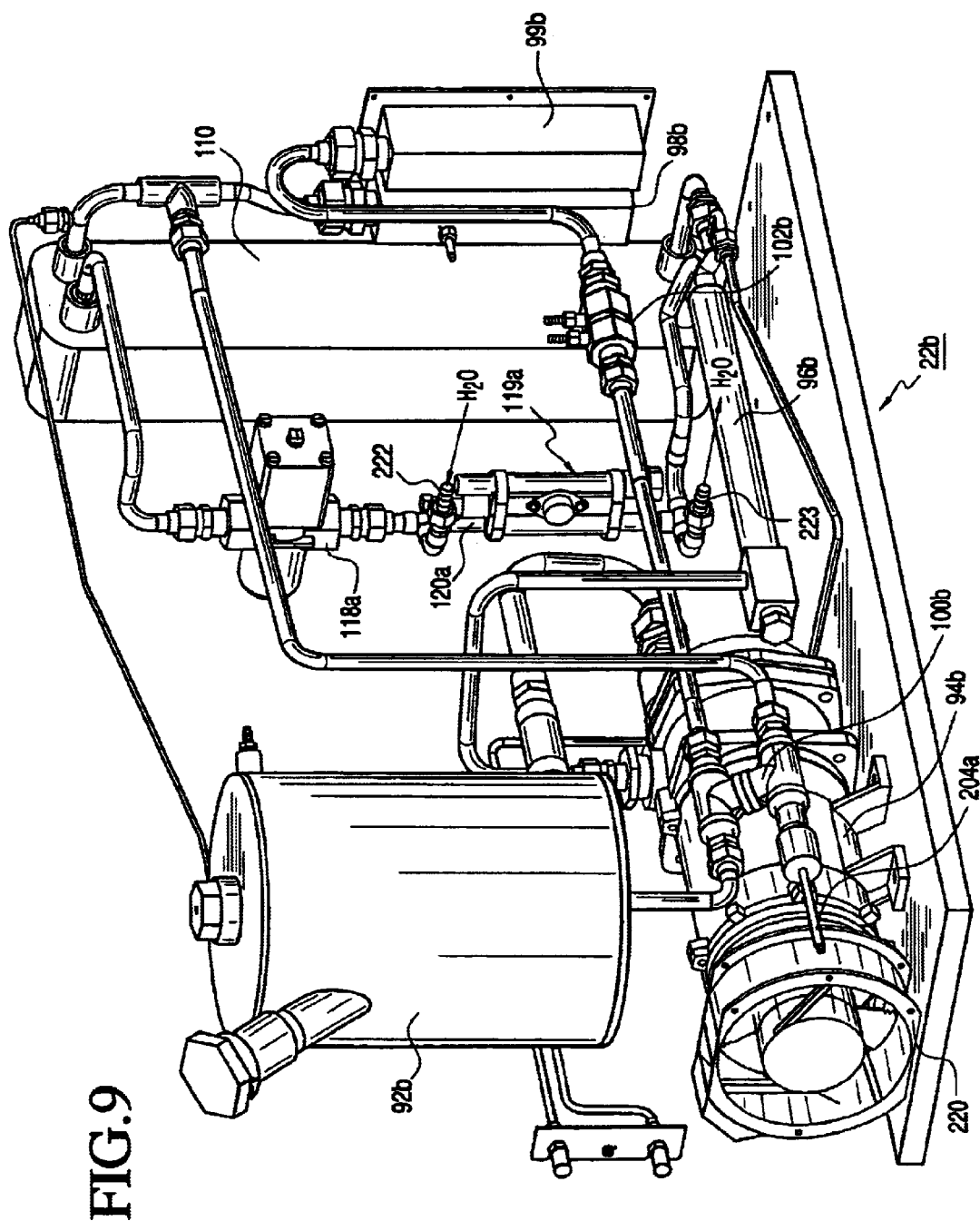
FIG. 9 is a perspective view of the disposition of elements in a practical module using a facilities water cooling loop in accordance with FIG. 3.

The present approach, of segmentation of the functional and physical characteristics of modules to provide a spectrum of different capabilities for meeting the different demands of a facility using a number of process tools can better be appreciated by analysis of the basically different units of FIGS. 8–10, 12 and 13. The modules fall into either one of two broad classes, namely refrigeration loop cooling systems (FIGS. 8, 10, 12 and 13) or water loop cooling systems (FIG. 9). A typical rear panel is shown in FIG. 11, demonstrating that multiple ports and gages can be accessible from this side and enable convenient coupling of thermal transfer fluid conduits from a module to different subunits or process tools.

The modules have a volumetric form factor based on a standard height, width and depth. Where larger components or subsystems are required, wider modules may be used that have the standard height and depth, and essentially double width. The system of FIG. 1 is illustrative of this approach. In practice, for example, a two-module high control chassis with may have outer dimensions of a 24" width, 48" height and 35" depth for two tiers of modules with standard form factor volumes of 10" wide, 24" high and 35" deep. The total assembly, including casters, drain pans and electronic controller box is about 70" in height.

Each module is supported on interior frame elements in the control chassis and has attached upstanding face and rear panels. Thus, each module may be individually withdrawn from the receptacle in which it is seated, for parts, service, shipping to a service center, and/or insertion of a different unit. When extracted from the control chassis, each module, as seen in FIGS. 8–10, 12 and 13 is open on three sides, so that components and subunits may readily be serviced and/or replaced. There are important implications in this approach for service and maintenance operations, particularly in relation to cost and personnel. It is found that with modern equipment, operative difficulties predominantly arise in mechanical and electromechanical components, with electronic and electrical devices in contrast being far longer lasting. Consequently, with the units almost fully open for inspection and service, the mechanical and electromechanical portions can be repaired with minimal difficulty, and if changes in modules are necessary, such as the need for a larger pump, this work can also be done in the field. At the same time, the modularity allows replacements of a defective or inoperative module or major part with an entirely new module, and the original unit can be shipped back to the factory or a service center. Consequently, when this approach is followed, skilled repairmen are not often needed in the field, and field maintenance costs and training needs are greatly reduced.

FIG. 8 illustrates the physical configuration of the elements of a refrigeration loop of cooler 20a or chiller that, in this example, can service the range from −20° C. to 120° C., and provide up to 3.6 KW of cooling at −20° C., with a flow rate from 3 gpm to 25 gpm at 100 psi. The cooling capacity in KW increases when the temperature to be maintained is higher. As seen in FIG. 8, the reservoir 82a for thermal transfer fluid is mounted behind but adjacent the face plate, 29a, and includes a capped fill pipe 200 for use when the system is down, and fill and drain valves 30a, 31a useable to add or remove thermal transfer fluid when the system is operating. The reservoir 92a is positioned above an enclosed regenerative turbine pump 94a of the type that contains the thermal transfer fluid within the motor enclosure, to serve as lubricant for internal hydrodynamic bearings throughout the entire operating temperature range. The motor/pump combination 94a receives returning fluid along an axis parallel to its axis of rotation, and impels the pressurized output flow tangentially from the periphery of its turbine blades. A copending application of K. W. Cowans assigned to the assignee of the present invention, Ser. No. 09/906,624 filed Jul. 18, 2001 and entitled "Pump System Employing Liquid Filled Rotor", describes a version of this pump which can be modified to employ double sets of turbine blades for greater flow rates if desired. In addition the motor/pump 92a is configured for rapid disassembly and reassembly and in practice it is often convenient to attach two pumps to the motor/pump for greater flow rates. Different sizes of motor/pump combinations can also be used in the module to meet specific needs. The location of the reservoir 92a above the pump 94a assures sufficient pressure head at the pump at all times, so that a pressurized arrangement is not needed. Only where there are special operative demands or physical restraints, the reservoir 92a for a module can be of smaller size and thermal transfer fluid can be fed from a common pressurized source to one or more chillers. Use of this alternative limits the versatility of the system and the ways in which modules can be employed. In the thermal transfer fluid loop, the reservoir 92a provides a reserve fluid mass which is cooled or heated to the level that is desired for the associated process tool subunit. This feature consequently aids in temperature stabilization, since the fluid mass slows down change rates. After initial cooling to a selected level, the refrigeration loop need only counteract the heat introduced by the process tool as it is being cooled.

For purposes of increased reliability the refrigeration loop also includes a high pressure switch 202 which operates at a given threshold, shutting down the system when needed to prevent overpressurization in the refrigeration loop. In the thermal transfer fluid loop, however, overpressurization is guarded against by the differential pressure valve 100a. A control shaft 204 for the differential pressure valve 100a is conveniently accessible at the face plate 29a because the valve body is coupled to a rear-to-front bypass line 206 that extends from a Tee 208 at the available output conduit from the evaporator/heat exchanger 54a near the module rear and extends past the valve 100a body. The refrigeration loop also includes a filter drier 210 to remove moisture accumulating in the refrigerant during cycling.

The flow meter 102a in the example of FIG. 8 is mounted in the return manifold 99a, adjacent the outlet end (only the ports to which the conduits and circuit are shown). The refrigeration loop includes a desuperheater valve 82a, a hot gas bypass valve 72a, a sight gauge 212 at the face panel, and pressure gauges 214, 215 also accessible at the face panel (which itself is not shown). Suction and discharge gauges 217, 218 respectively for thermal transfer fluid are in the rear panel for viewing from the process side. Connector conduits to points in the system have been omitted in this view.

In a practical implementation of a cooling system which employs only facilities water as a coolant, referring now to FIG. 9, the liquid/liquid counterflow heat exchanger 110 is mounted conveniently near the back section of the module 22a. The supply and return manifolds 98b, 99b respectively for transfer fluid are adjacent, with ports (not shown in FIG. 9) facing in the direction of the process tool. The flow meter 102b is disposed in the line from the return manifold 99b that leads to the reservoir 92b near the face of the module. This view more clearly shows the pressure differential valve 100b close to the front of the module 22a, and the thresholds adjustment shaft 204a accessible through the face plate (not shown). Also a fan 220 at the face end is positioned in axial alignment with the motor/pump 94b, for cooling the motor shell. The axial input to and tangential output from the motor/pump 94b also can be more clearly seen in this view.

In the mid-region of the module 22a, the nipples or connectors 222 and 223 for intake and outflow of facilities water (the exterior lines themselves are not shown) are on opposite sides of a pressure control device 119a in close relation to a water reference line 120a between the supply connector 222 and the return connector 223. The enclosed structure including electrical heater 130, bulb 134 and reference line 120a of FIG. 5 is below the flow control valve 118a in the supply line 112. The electrical line on which a control signal is applied to the heater and the pressurized gas conduit between the bulb in the temperature responsive pressure control device 119a and the flow control valve 118a are not shown in this view, for simplicity and because they are straightforward implementations.

Figure 10:
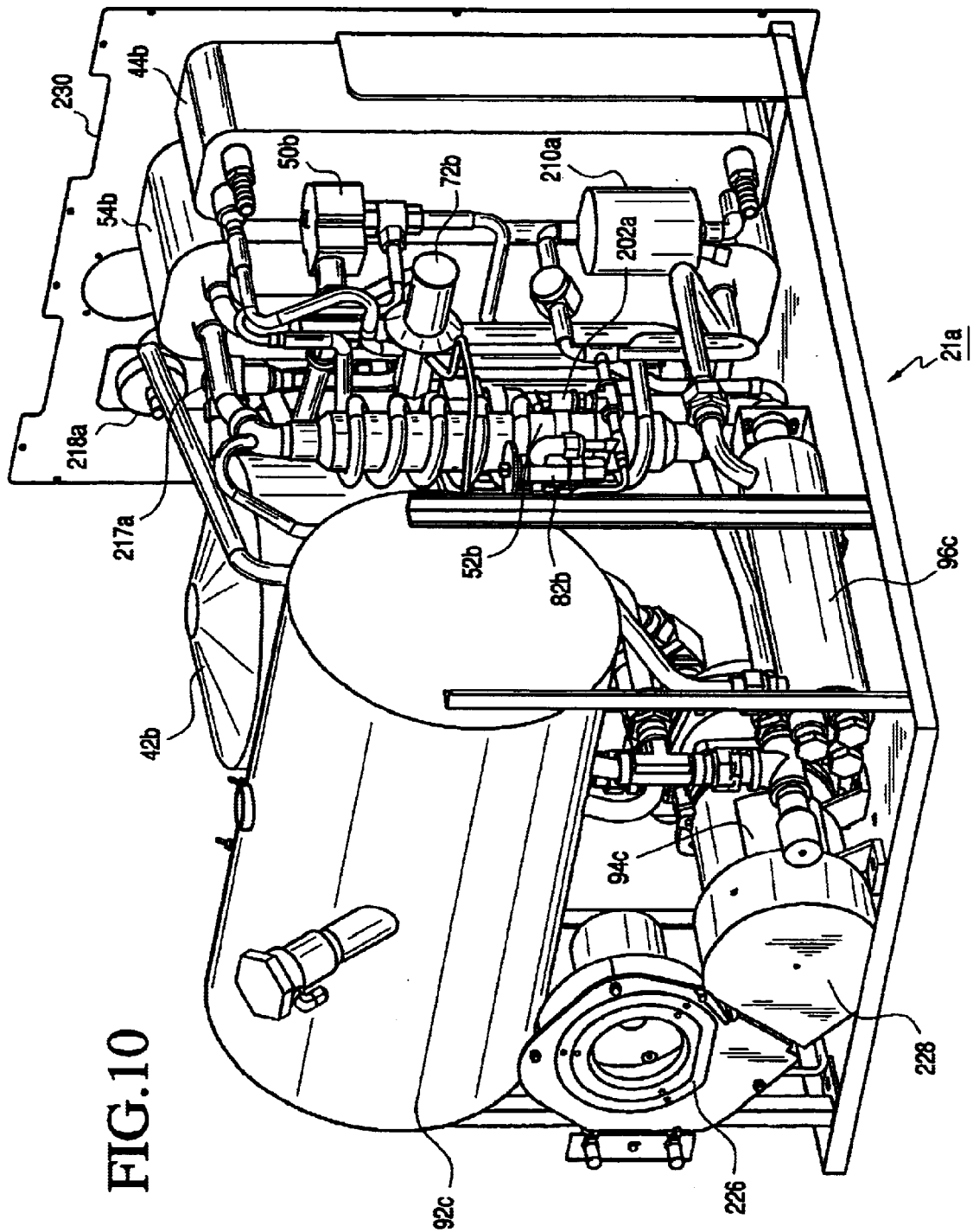
FIG. 10 is a perspective view of the arrangement of elements in a double width module using a refrigeration loop in accordance with FIG. 2 to provide 10 hp compressor capability.
Figure 12:
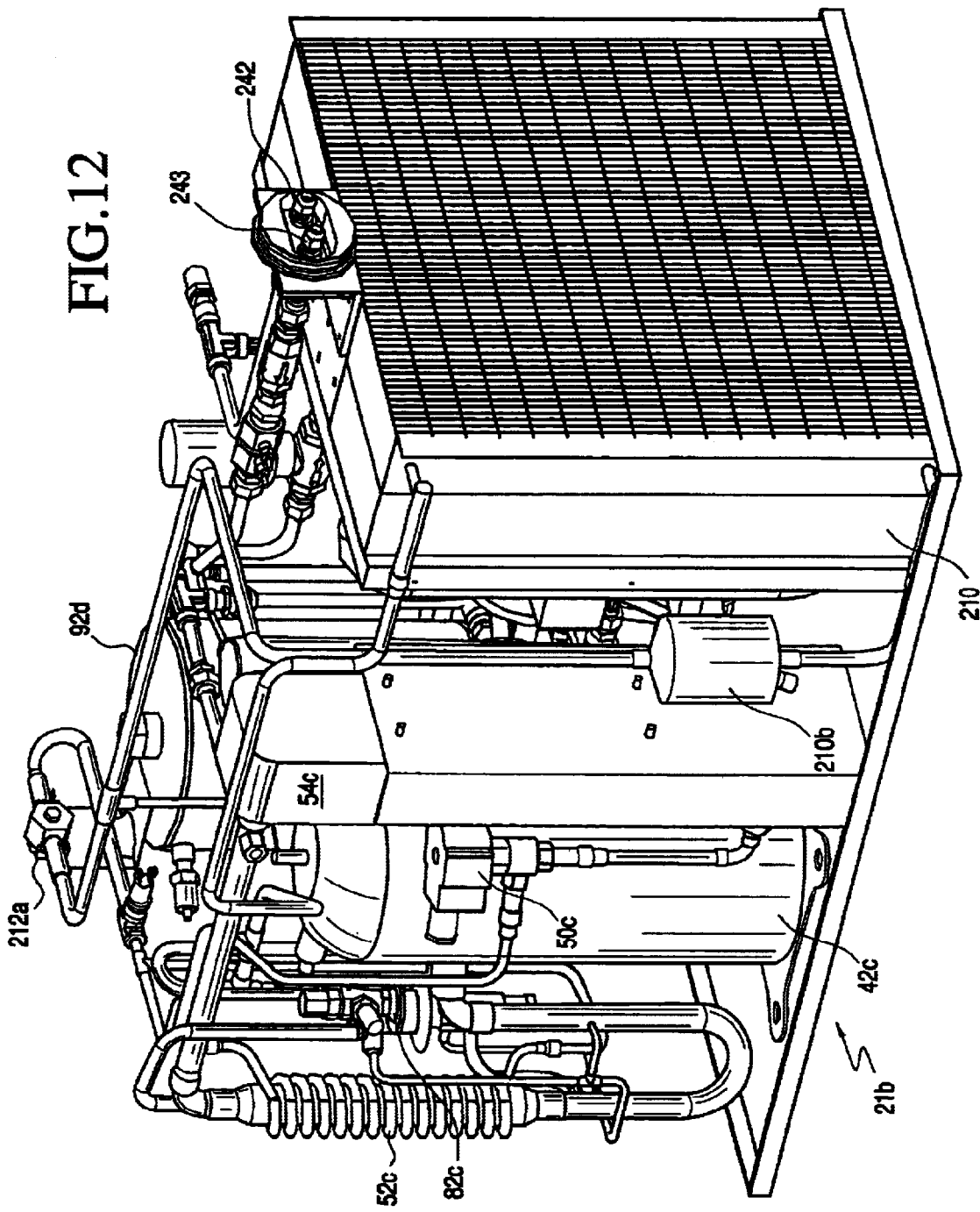
FIG. 12 is a perspective view of a different example of chiller in accordance with FIG. 2, in which a double width module includes an air cooled compressor.

The double width module 21a is used, as shown in FIG. 10, where a more powerful chiller is required. The elements and subsystems correspond to the system of FIG. 8, but capacity demands are substantially higher and the units therefore discernibly larger. The compressor 42b is an upstanding 10 HP unit whose height is a considerable majority of the module 21a height. The reservoir 92c is again above the motor/pump 94c but, since it has considerably greater volume, this cylindrical body is centered about a horizontal axis. The motor/pump combination 94c is centrally disposed in front to back position as before, but a fan 226 for cooling the motor is displaced from the motor axis to one side and directs air tangentially into a shroud structure 228 which then directs cooling air axially along the motor/pump unit.

Other differences of a design nature from the smaller unit of FIG. 8 are to be noted. The electrical heater 96c for thermal transfer fluid is similarly situated to that in FIG. 8 but of larger size and capacity. The subcooler 52b is along a vertical axis, adjacent the compressor 42b (facilities water conduits for which are not shown), and the other elements in the refrigeration loop are also disposed within a volume bounded by the condenser 52b and evaporator/heat exchanger 54b at the back plate 230, the compressor 42b on one side and the reservoir 96c in the front portion. These elements include the solenoid expansion valve 50b, hot gas bypass valve 72b, desuperheater valve 82b, refrigerant drier filter 210a, and high pressure switch 202a.

The double width chiller module 21a of FIG. 10 incorporates a substantially larger 7.5–15 hp compressor with a 5–15 KW cooling capability down to −40° C., although again the kilowatt cooling power increases substantially if the needed temperature limit is not so low. Again the upper limit of the range is in excess of 120° C., and the flow rate at 100 psi can be in the range from 3–25 gpm with the standard pumps available.

As seen in FIG. 11, the manifolds 98a, 99a for the thermal transfer fluid are at or adjacent the rear panel 230, which also includes suction and discharge gauge openings 223, 234 visible from the process tool side of the unit. The rear panel 230 also includes an air outlet 235 open to the environment for aiding cooling. Each manifold 98a, 99a, as also seen in FIG. 11, includes a number of exterior ports 237, 239 respectively for parallel connection of supply and return flows with different subunits of the process tool.

A double width configuration can also be used where the process location does not provide for or permit the use of facilities water, for condenser cooling in the refrigeration loop. In this event, referring to FIG. 12, the rear region of this double width module 21b can mount a large air-cooled condenser 240, and the evaporator/heat exchanger 54c is positioned in a mid-region between the compressor 42c and the condenser. The compressor 42c is at one side of the module 21b, with the desuperheater valve 82c adjacent and the hot gas bypass valve being obscured in this view, as is the electrical heater for thermal transfer fluid. The sight gauge 212a is visible in the front panel region, which panel, for better visualization, is not included in this view. A cooling fan and the end of the motor/pump 94d system are also not shown in order that the condenser 240 appears more clearly. The subcooler 52c in this arrangement is vertically disposed adjacent the compressor 42c, while supply and return ports 242, 243 respectively, are disposed on the process side, above the air cooled condenser 240, instead of supply and return manifolds.

The system depicted has a cooling capacity of 2,500 watts at 40° C., using a 5 HP compressor in the double width structure. A chiller which does not require facilities water for cooling also can serve other special needs of process tools.

Figure 13:
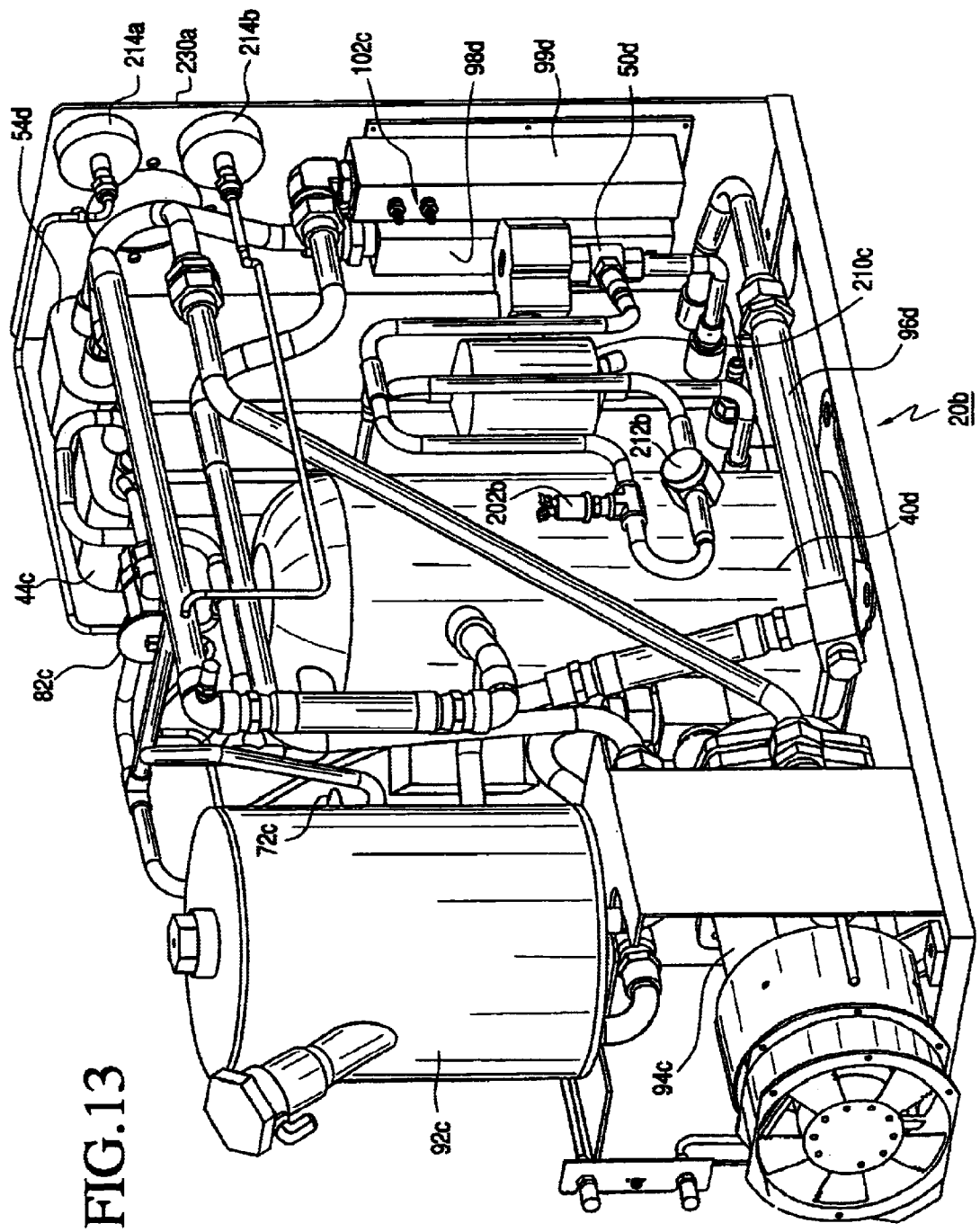
FIG. 13 is a perspective view of yet another practical chiller with 5 hp compressor power but which does not employ a subcooler in the refrigeration loop.

The chiller system 20b of FIG. 13 is configured to be consistent with the standard form factor and use a 5 HP compressor 42d to provide 3 kwatts of cooling at down to 20° C. This relatively lesser chilling requirement can be met without employing a subcooler in the refrigeration loop. However, the desuperheater valve 82c and the hot gas bypass valve 72c are used to safeguard against overheating and underpressurizing conditions.

It should also be noted that more than one evaporator/heat exchanger could be disposed in the space available within the interior of the module, side by side with the evaporator/heat exchangers that are shown. In addition, chiller units can be cascaded so that more than one compressor can be used to bring the temperature down to a minimum level.

These variants in the chiller system demonstrate that there are feasible internal changes as well as operating changes, as from cooling to heating, which make the module especially versatile.

In summary, therefore, this modular approach enhances the manner in which multiple processes can be temperature controlled with low capital expenditures. Thermal transfer fluid flows to be supplied to one subunit or different subunits, separately or in parallel, can be at chosen temperatures, given flow rates and pressures, and cooling or heating capacities can meet specific needs. At the same time, the cooling and heating requirements are met in energy efficient ways, but low demands for floor space, or restriction imposed by maintenance requirements.

Although a number of forms and modifications have been described above, it will be appreciated that the invention is not limited thereto but encompasses all variations and expedients within the terms of the appended claims.

What is claimed is:

1. A temperature control unit for supplying thermal transfer fluid at a specified temperature and with a needed flow rate to more than one unit in a process tool and configured such that the thermal transfer fluid is temperature controllable with energy efficiency in temperature ranges from low temperature chilling to high temperature heating, comprising:

a first temperature control module having a refrigeration loop including a compressor, condenser and evaporator/heat exchanger, and including a condenser bypass loop for providing pressurized hot gas refrigerant, the first module also including a thermal transfer fluid reservoir, a pump for the thermal transfer fluid and a first conduit system directing the thermal transfer fluid through the evaporator/heat exchanger in heat exchange relation to the refrigerant, and a second conduit system for alternatively directing refrigerant as a hot gas from the compressor through the evaporator/heat exchanger; and a second temperature control module having a thermal transfer fluid reservoir, a liquid/liquid heat exchanger, a pump for the thermal transfer fluid loop directing thermal transfer fluid through the heat exchanger, and a water cooling loop receiving facilities water at available temperature and directing it through the heat exchanger in thermal exchange relation with the thermal transfer fluid.

2. A temperature control unit as set forth in claim 1 above, including a control chassis having module receptacles with standard form factors in width and depth, and wherein the first and second control modules have form factors fitting within the receptacles to permit interchangeability.

3. A temperature control unit as set forth in claim 1 above, including an expansion valve in the refrigerant loop for varying the refrigerant flow to adjust the thermal transfer fluid to the specified temperature level, and also including a water flow control valve in the water cooling loop to adjust the thermal transfer fluid to its specified temperature level.

4. A temperature control unit as set forth in claim 1 above, wherein the first temperature control module includes a hot gas bypass valve in the second conduit system and responsive to the compressor input pressure, and wherein the second conduit system from the compressor output is directed serially through the thermal transfer fluid reservoir and through the evaporator/heat exchanger to sweep out oil contained in the refrigerant while heating the thermal transfer fluid.

5. A temperature control unit as set forth in claim 1 above, wherein each of the control modules includes a heating element in the first conduit system for adding thermal energy when needed to raise the temperature to a specified level for that module.

6. A temperature control unit as set forth in claim 5 above, wherein the compressor power of the first control module is selected to provide cooling to a selected low temperature level, and the first control module provides heating to a selected maximum temperature level with a combination of pressurized hot gas and heating from the heating element, and wherein the second control module provides cooling to a minimum level determined by the temperature of the facilities water and heating with the heating element.

7. A temperature control unit as set forth in claim 1 above, wherein the control modules each include supply and return manifolds for coupling thermal transfer fluid to and from more than one process tool and wherein the unit further includes a processor system responsive to the chosen setpoints and to thermal transfer fluid temperatures for controlling the coolant flows in the first and second temperature control modules.

8. A temperature control system for alternative control of the temperature of a process tool by chilling or heating using a cycling thermal transfer fluid comprising:

a refrigeration loop for flowing a refrigerant and including a compressor, a condenser in series therewith, a refrigerant flow control, and an evaporator/heat exchanger;

a thermal transfer fluid loop comprising a fluid reservoir, a pump, and connections for cycling the fluid to and from the process tool, the fluid loop being directed through the evaporator/heat exchanger;

a bypass path for pressurized hot gas refrigerant from the compressor to the evaporator/heat exchanger; and a hot gas bypass valve responsive to the input pressure of refrigerant to the compressor for directing hot gas into the bypass path, such that compressor energy is used for cooling when the flow control is used and heating when the flow control shuts off refrigerant flow.

9. A temperature control system as set forth in claim 8 above, wherein the bypass path extends through the reservoir prior to coupling to the evaporator/heat exchanger and the system includes a desuperheater valve responsive to refrigerant temperature at the compressor input for directing refrigerant output from the condenser to the compressor input.

10. A temperature control system as set forth in claim 9 above, wherein the system further includes a heater in the thermal transfer fluid loop, and a subcooler in the refrigeration loop, the subcooler being disposed to effect thermal energy interchange between return flow from the evaporator/heat exchanger to the compressor and refrigerant supplied to the evaporator/heat exchanger form the condenser.

11. A temperature control system as set forth in claim 10 above, wherein the refrigerant flow control comprises a solenoid expansion valve operating in a variable duty cycle mode, and the system further includes a high pressure relief valve in the refrigeration loop.

12. The method of controlling the temperature of a process tool with a thermal transfer fluid supplied from a reservoir, comprising the steps of:
   pressurizing a refrigerant to provide pressurized hot gas;
   when the process tool is to be heated, extracting pressurized hot gas for heating the thermal transfer fluid from the reservoir while first preheating the fluid in the reservoir by passing the hot gas through the reservoir;
   when the process tool is to be cooled, condensing the pressurized hot gas to a liquid pressurized refrigerant, and
   controllably alternatively directing the hot gas or the liquid pressurized refrigerant in heat exchange relation to the thermal transfer fluid to heat or chill the thermal transfer fluid to a selected temperature level before application to the process tool.

13. A method as set forth in claim 12 above, wherein the step of directing the refrigerant in heat exchange relation comprises passing the refrigerant in evaporative relation to the thermal transfer fluid.

14. A method as set forth in claim 13 above, including the further step of cooling by subcooling liquid pressurized refrigerant with refrigerant returning from heat exchange with the thermal transfer fluid.

15. A method as set forth in claim 12 above, including the step of adding electrical heat energy to the thermal transfer fluid when heating the thermal transfer fluid with hot gas.

16. A method as set forth in claim 12 above, wherein the pressurized hot gas is in the range of up to about 120° C. and wherein the method includes the further steps of sensing when the refrigerant to be pressurized is in excess of predetermined temperature, and adding pressurized liquid refrigerant thereto before pressurizing.

17. A method for controlling the operating temperature of a process tool in a range from about −40° C. to about +120° C. using a fluid reservoir for thermal transfer fluid moving in a loop through the process tool and a refrigeration loop including a compressor, condenser, evaporator/heat exchanger and a controllable expansion valve for controlling the flow of pressurized liquid refrigerant to the evaporator/heat exchanger, comprising the steps of:
   generating an indication of the difference between the desired and actual temperature thermal transfer fluid to be supplied to for the process tool;
   passing the thermal transfer fluid through the evaporator/heat exchanger;
   controlling, by use of the expansion valve, the rate of evaporation of the condensed refrigerant in the evaporator/heat exchanger based upon the difference indication when the desired temperature is in a low temperature zone;
   extracting a hot gaseous refrigerant flow from the compressor for use in heating the thermal transfer fluid when the desired temperature is in a median temperature zone;
   passing the hot gaseous refrigerant through the reservoir contents in heat exchange relation with the thermal transfer fluid;
   adding heat to the heat transfer fluid to raise the temperature of the process tool to a high temperature zone, and
   flowing the thermal transfer fluid through the process tool to regulate the temperature of the process tool.

* * * * *